US012516341B2

(12) United States Patent
Qi et al.

(10) Patent No.: US 12,516,341 B2
(45) Date of Patent: Jan. 6, 2026

(54) USE OF FLAVONOID GLYCOSIDE SUBSTANCE AND GLYCOSYLTRANSFERASE GENE FOR REGULATING RESISTANCE OF PLANTS TO WEEDS

(71) Applicant: ZHONGKENONGFU(BEIJING) BIOTECHNOLOGY CO., LTD, Beijing (CN)

(72) Inventors: Xiaoquan Qi, Beijing (CN); Aimin Ma, Beijing (CN); Bo Song, Beijing (CN)

(73) Assignee: ZHONGKENONGFU(BEIJING) BIOTECHNOLOGY CO., LTD, Beijing (CN)

( * ) Notice: Subject to any disclaimer, the term of this patent is extended or adjusted under 35 U.S.C. 154(b) by 414 days.

(21) Appl. No.: 17/905,980

(22) PCT Filed: Aug. 10, 2020

(86) PCT No.: PCT/CN2020/108151

§ 371 (c)(1),
(2) Date: Sep. 9, 2022

(87) PCT Pub. No.: WO2021/179530

PCT Pub. Date: Sep. 16, 2021

(65) Prior Publication Data

US 2023/0203524 A1 Jun. 29, 2023

(30) Foreign Application Priority Data

Mar. 12, 2020 (CN) ......................... 202010169781.2
Mar. 12, 2020 (CN) ......................... 202010169977.1

(51) Int. Cl.

*C12N 15/82* (2006.01)
*A01N 43/16* (2006.01)
*A01P 13/02* (2006.01)
*A01P 21/00* (2006.01)
*C12N 9/10* (2006.01)

(52) U.S. Cl.

CPC ......... *C12N 15/8279* (2013.01); *A01N 43/16* (2013.01); *A01P 13/02* (2021.08); *A01P 21/00* (2021.08); *C12N 9/1048* (2013.01)

(58) Field of Classification Search

None
See application file for complete search history.

(56) References Cited

U.S. PATENT DOCUMENTS

2006/0123505 A1* 6/2006 Kikuchi ............... C07K 14/415
536/23.6

FOREIGN PATENT DOCUMENTS

KR 101905070 B1 * 10/2018 ............. A01N 43/08

OTHER PUBLICATIONS

Yang et al., 2017, Interference of allelopathic rice with penoxsulam-resistant barnyardgrass. Pest management science, 73(11), 2310-2317. (Year: 2017).*

Wang et al., 2018, Rice Secondary Metabolites: Structures, Roles, Biosynthesis, and Metabolic Regulation. Molecules, 23(12), 3098. (Year: 2018).*

Kong, C. H., Zhao, H., Xu, X. H., Wang, P., & Gu, Y. (2007). Activity and allelopathy of soil of flavone O-glycosides from rice. Journal of agricultural and food chemistry, 55(15), 6007-6012. (Year: 2007).*

First Office Action issued in corresponding Chinese Application No. 202010169781.2; mailed Jan. 11, 2022; 13 pgs.

First Office Action issued in corresponding Chinese Application No. 202010169977.1; mailed Jan. 5, 2022; 11 pgs.

International Search Reports issued in International Application No. PCT/CN2020/108151; mailed Dec. 11, 2020; 10 pgs.

Kong, C. H., et al.; "Activity and Allelopathy of Soil of Flavone 0-Glycosides from Rice"; Journal of Agricultural and Food Chemistry, vol. 55,Nr: 15, Jun. 30, 2007; pp. 6007-6012.

GenBank; NCBI Reference Sequence: XM_015789990.2; Predicted: *Oryza sativa* Japonica Group anthocyanidin 3-0-glucosyltransferase 2 (LOC4343325), mRNA; Aug. 7, 2018; 2 pgs.

GenPept; NCBI Reference Sequence: XP_015645476.1; anthocyanidin 3-0-glucosyltransferase 2 [*Oryza sativa* Japonica Group]; Aug. 7, 2018; 2 pgs.

* cited by examiner

*Primary Examiner* — Charles Logsdon
*Assistant Examiner* — Jessica Nicole Stockdale
(74) *Attorney, Agent, or Firm* — HAUPTMAN HAM, LLP

(57) ABSTRACT

The present invention discloses the use of a flavonoid glycoside and glycosyltransferase gene thereof in regulating plant resistance to weeds. The present invention provides the use of tricin-5-O-glucopyranoside in any one of the following: regulating plant allelopathy; regulating plant resistance to weeds; inhibiting the growth of weeds, and the use of Os07g0503900 protein or related biological materials thereof in any one of the following: regulating plant allelopathy; regulating plant resistance to weeds; regulating the content of tricin-5-O-glucopyranoside in plants; catalyzing the glycosylation of tricin to generate tricin-5-O-glucopyranoside; act as or preparing glycosylation transferase; inhibiting the growth of weeds. The present invention is of great significance for developing environment-friendly green pesticides, cultivating rice varieties with high allelopathy and regulating the biosynthesis of tricin-5-O-glucopyranoside, and provides theoretical guidance for the control of weeds in paddy fields.

1 Claim, 4 Drawing Sheets

Specification includes a Sequence Listing.

```
                         Oligo1                                   Oligo2
WT      AAGCGGATGCTGCGCAGCCGCTG-CTGCGGCGACGACGACGACGGCCGCCC-CGCCATGTCGCTCACCGTGCTC
ugt4-1  AAGCGGATGCTGCGCAGCCGCTGGCTGCGGCGACGACGACGACGGCCGCCC-CGCCATGTCGCTCACCGTGCTC
ugt4-2  AAGCGGATGCTGCGCAGCCGCTGTCTGCGGCGACGACGACGACGGCCGCCC-CGCCATGTCGCTCACCGTGCTC
ugt4-3  AAGCGGATGCTGCGCAGCCGCTG-CTGCGGCGACGACGACGACGGCCGCCCTCGCCATGTCGCTCACCGTGCTC
ugt4-4  AAGCGGATGCTGCGCAGCCGCTG-CTGCGGCGACGACGACGACGGCCGCCCACGCCATGTCGCTCACCGTGCTC
                               114                                141
```

FIG. 5(A)

```
WT      MAPAMASSAATVVLIPFCVSGHLTPMLEVGKRMLRSRCCGDDDDGRPAMSLTVLLAQLPESHRAPEIDEIIRR*
ugt4-1  MAPAMASSAATVVLIPFCVSGHLTPMLEVGKRMLRSRWLRRRRRRPPRHVAHRAPRAAAGVPPRARDRRDHPP*
ugt4-2  MAPAMASSAATVVLIPFCVSGHLTPMLEVGKRMLRSRWLRRRRRRPPRHVAHRAPRAAAGVPPRARDRRDHPP*
ugt4-3  MAPAMASSAATVVLIPFCVSGHLTPMLEVGKRMLRSRCCGDDDDGRPRHVAHRAPRAAAGVPPRARDRRDHPP*
ugt4-4  MAPAMASSAATVVLIPFCVSGHLTPMLEVGKRMLRSRCCGDDDDGRPRHVAHRAPRAAAGVPPRARDRRDHPP*
                                             38        48                         74
```

FIG. 5(B)

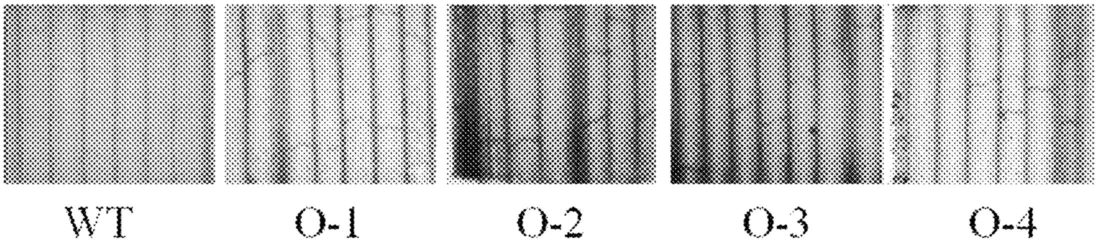

FIG. 6

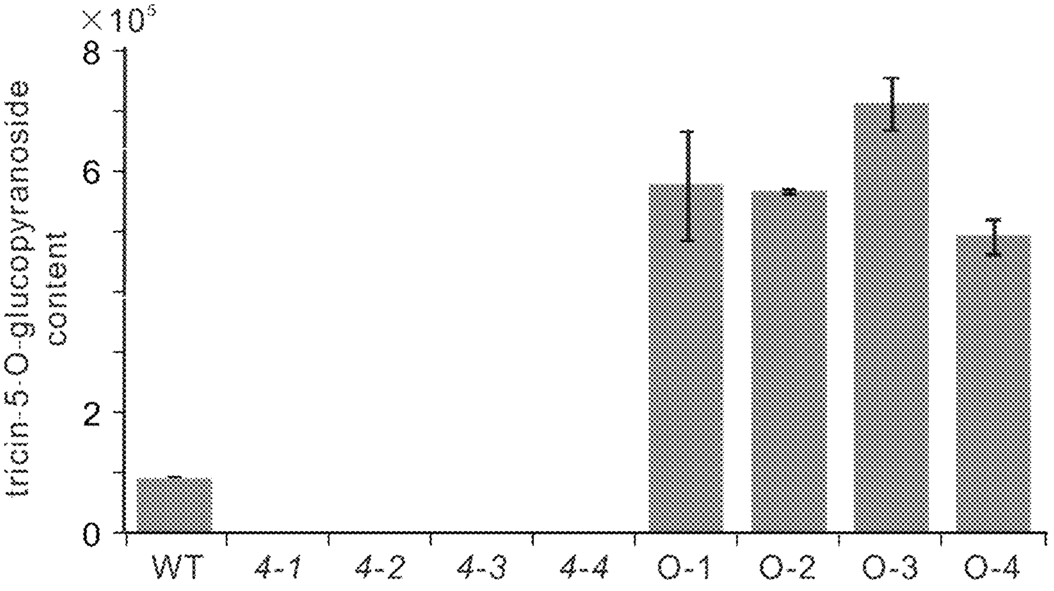

FIG. 7

USE OF FLAVONOID GLYCOSIDE SUBSTANCE AND GLYCOSYLTRANSFERASE GENE FOR REGULATING RESISTANCE OF PLANTS TO WEEDS

RELATED APPLICATIONS

The present application is a U.S. National Phase of International Application Number PCT/CN2020/10815, filed Aug. 10, 2020, and claims priority to Chinese Application Numbers 202010169781.2 and 202010169977.1, both filed on Mar. 12, 2020.

INCORPORATION BY REFERENCE

The sequence listing provided in the file entitled Sequence_List_C6351-086.txt, which is an ASCII text file that was created on Sep. 8, 2022, and which comprises 14,012 bytes, is hereby incorporated by reference in its entirety.

FIELD OF THE INVENTION

The present invention relates to the field of biotechnology, in particular to the use of a flavonoid glycoside and glycosyltransferase gene thereof in regulating plant resistance to weeds.

BACKGROUND OF THE INVENTION

Flavonoids are a class of natural metabolites that are widely distributed in plants and contain a C6-C3-C6 basic skeleton. According to the degree of oxidation of the central three-carbon chain, whether it is cyclic or not, and the connection position of the B-ring (2- or 3-position), the main natural flavonoids can be divided into flavonoids, flavonols, dihydroflavonoids, dihydroflavonols, anthocyanins, isoflavones and the like. Most flavonoids are combined with sugar to form glycosides in plants, and some of them exist in free state (in the form of aglycone). Flavonoids have strong anti-inflammatory and anticancer effects, and have great use prospects in the treatment of cardiovascular disease, coronary heart disease, tumors and other diseases. In addition, flavonoids play an important role in plant growth and development, antioxidant, biotic stress and so on. Such as regulating hormone transport, protecting plants from UV-B radiation as a UV-absorbing compound, inhibiting the growth of weeds, etc.

At present, the flavonoids found in rice that can inhibit the growth of weeds (allelopathy) are mainly tricin, and whether other flavonoids have allelopathy, as well as the genetic mechanism and weed inhibitory mechanism of rice allelopathy are not very clear. It is also unclear whether genes capable of regulating the expression of flavonoids can regulate allelopathy in plants.

SUMMARY OF THE INVENTION

The purpose of the present invention is to provide the use of a flavonoid glycoside and glycosyltransferase gene thereof in regulating plant resistance to weeds.

In a first aspect, the present invention claims the use of tricin-5-O-glucopyranoside in any one of the following:

P1, regulating the allelopathy of a plant.

The regulating the allelopathy of a plant is embodied in increasing the content of tricin-5-O-glucopyranoside in the plant, so that the allelopathy of the plant is enhanced.

P2, regulating the resistance of the plant to a weed.

The regulating the resistance of the plant to a weed is embodied in increasing the content of tricin-5-O-glucopyranoside in the plant, so that the plant resistance to the weed is enhanced.

P3, inhibiting the growth of the weed.

In a second aspect, the present invention claims a method for cultivating a plant variety with enhanced allelopathy.

The method for cultivating a plant variety with enhanced allelopathy as claimed in the present invention can comprise the steps of: increasing the content of tricin-5-O-glucopyranoside in a recipient plant to obtain a plant variety with enhanced allelopathy.

In a third aspect, the present invention claims a method for cultivating a plant variety with weakened allelopathy.

The method for cultivating a plant variety with weakened allelopathy as claimed in the present invention can comprise the steps of: reducing the content of tricin-5-O-glucopyranoside in a recipient plant to obtain a plant variety with weakened allelopathy.

In a fourth aspect, the present invention claims a method for cultivating a plant variety with enhanced resistance to weeds.

The method for cultivating a plant variety with enhanced resistance to weeds as claimed in the present invention can comprise the steps of: increasing the content of tricin-5-O-glucopyranoside in recipient plants to obtain a plant variety with enhanced resistance to weeds.

In a fifth aspect, the present invention claims a method for cultivating a plant variety with weakened resistance to weeds.

The method for cultivating a plant variety with weakened resistance to weeds as claimed in the present invention can comprise the steps of: reducing the content of tricin-5-O-glucopyranoside in recipient plants to obtain a plant variety with weakened resistance to weeds.

In the foregoing, increasing the content of tricin-5-O-glucopyranoside in the recipient plant can be implemented as follows:

(A1) increasing the activity and/or expression level of a protein capable of catalyzing the transformation of other substances into tricin-5-O-glucopyranoside in the recipient plant; and/or (A2) reducing the activity and/or the expression level of a protein capable of catalyzing the transformation of tricin-5-O-glucopyranoside into other substances in the recipient plant.

In the foregoing, reducing the content of tricin-5-O-glucopyranoside in the recipient plant can be implemented as follows:

(B1) reducing the activity and/or expression level of a protein capable of catalyzing the transformation of other substances into tricin-5-O-glucopyranoside in the recipient plant; and/or (B2) increasing the activity and/or the expression level of a protein capable of catalyzing the transformation of tricin-5-O-glucopyranoside into other substances in the recipient plant.

Further, (A1) can be implemented by the following (a1); (A2) can be implemented by the following (a2):

(a1) introducing into the recipient plant a gene encoding a protein capable of catalyzing the transformation of other substances into tricin-5-O-glucopyranoside;

(a2) inhibiting expression of a gene encoding a protein capable of catalyzing the transformation of tricin-5-O-glucopyranoside into other substances in the recipient plant.

(B1) can be implemented by the following (b1); (B2) can be implemented by the following (b2):

(b1) inhibiting the expression of a gene encoding a protein capable of catalyzing the transformation of other substances into tricin-5-O-glucopyranoside in the recipient plant;

(b2) introducing into the recipient plant a gene encoding a protein capable of catalyzing the transformation of tricin-5-O-glucopyranoside into other substances.

Wherein, the other substance can be a substance that cannot enhance the allelopathy of the recipient plant, or is a substance that enhances the allelopathy of the recipient plant to a weaker degree than tricin-5-O-glucopyranoside. Alternatively, the other substance can be a substance that cannot enhance the resistance of the recipient plant to weeds, or is a substance that enhances the resistance of the recipient plant to weeds to a weaker degree than tricin-5-O-glucopyranoside.

In the present invention, in (A1), (a1), (B1) and (b1), the other substance is tricin.

In a sixth aspect, the present invention claims a method for inhibiting the growth of a weed.

The method for inhibiting the growth of a weed as claimed in the present invention can comprise the following steps (C1) or (C2):

(C1) externally applying tricin-5-O-glucopyranoside to the weed;

(C2) externally applying the leaf water washing solution of the plant variety with enhanced resistance to the weed cultivated by the method III as described above to the seeds of the weeds.

In step (C1), the working concentration of tricin-5-O-glucopyranoside can be 500 mg/L and above.

In a specific embodiment of the present invention, the working concentration of tricin-5-O-glucopyranoside is specifically 500 mg/L.

In step (C2), the leaf water washing can be prepared according to a method comprising the following steps: adding the leaves of the plant variety with enhanced resistance to weeds into water at a ratio of 12 g to 200 mL, sealing and shaking at 37° C. for 4 h extraction (220 rpm) and standing at room temperature for 20 h, freeze-drying to obtain a solid water washing; wherein each 12 mL of the solution of the leaf water washing (working solution) contains the solid water washing extracted from 12 g of leaves.

In a seventh aspect, the present invention claims the use of Os07g0503900 protein or related biological materials thereof in any one of the following:

Q1, regulating the allelopathy of a plant.

The regulating the allelopathy of a plant is embodied in increasing the activity and/or content of Os07g0503900 protein in the plant, so that the allelopathy of the plant is enhanced.

Q2, regulating the resistance of the plant to a weed.

The regulating the resistance of the plant to a weed is embodied in increasing the activity and/or content of Os07g0503900 protein in the plant, so that the plant resistance to weeds is enhanced.

Q3, regulating the content of tricin-5-O-glucopyranoside in the plant.

The regulating the content of tricin-5-O-glucopyranoside in the plant is embodied in increasing the activity and/or content of the Os07g0503900 protein in the plant, and the content of tricin-5-O-glucopyranoside in the plant increases; and/or reduce the activity and/or content of Os07g0503900 protein in the plant, so that the content of tricin-5-O-glucopyranoside in the plant is reduced.

Q4, catalyzing the glycosylation of tricone to generate tricin-5-O-glucopyranoside;

Q5, as or preparation of glycosylation transferase;

in the present invention, the glycosylation acceptor is tricin.

In a specific embodiment of the present invention, the glycosylation donor is UDPG.

Q6, inhibiting the growth of the weed.

The related biological material is a nucleic acid molecule capable of expressing the Os07g0503900 protein or an expression cassette, a recombinant vector, a recombinant bacteria or a transgenic cell line containing the nucleic acid molecule.

The Os07g0503900 protein is any one of the following proteins:

(D1) a protein with amino acid sequence of SEQ ID No.1 or SEQ ID No.3;

(D2) a protein with the same function after the amino acid sequence shown in SEQ ID No.1 or SEQ ID No.3 has undergone substitution and/or deletion and/or addition of one or several amino acid residues;

(D3) a protein having 99% or more, 95% or more, 90% or more, 85% or more or 80% or more homology with the amino acid sequence defined in any one of (D1)-(D2) and having the same function;

(D4) a fusion protein obtained by attaching a tag to the N-terminus and/or C-terminus of any one of the proteins defined in (D1)-(D3).

In the above proteins, the tag refers to a polypeptide or protein that is fused and expressed with the target protein by using DNA in vitro recombination technology, so as to facilitate the expression, detection, tracing and/or purification of the target protein. The tags can be Flag tags, His tags, MBP tags, HA tags, myc tags, GST tags, and/or SUMO tags, and the like.

In an eighth aspect, the present invention claims a method for cultivating a plant variety with enhanced allelopathy.

The method for cultivating a plant variety with enhanced allelopathy as claimed in the present invention can comprise the steps of: increasing the activity and/or content of Os07g0503900 protein in a recipient plant to obtain a plant variety with enhanced allelopathy. The Os07g0503900 protein is any one of the proteins shown in (D1)-(D4) above.

In a ninth aspect, the present invention claims a method for cultivating a plant variety with weakened allelopathy.

The method for cultivating a plant variety with weakened allelopathy as claimed in the present invention can comprise the steps of: reducing the activity and/or content of Os07g0503900 protein in a recipient plant to obtain a plant variety with weakened allelopathy. The Os07g0503900 protein is any one of the proteins shown in (D1)-(D4) above.

In a tenth aspect, the present invention claims a method for cultivating a plant variety with enhanced resistance to a weed.

The method for cultivating a plant variety with enhanced resistance to weeds as claimed in the present invention can comprise the steps of: increasing the activity and/or content of Os07g0503900 protein in a recipient plant to obtain a plant variety with enhanced resistance to weeds. The Os07g0503900 protein is any one of the proteins shown in (D1)-(D4) above.

In an eleventh aspect, the present invention claims a method for cultivating a plant variety with weakened resistance to a weed.

The method for cultivating a plant variety with weakened resistance to the weed as claimed in the present invention can comprise the steps of: reducing the activity and/or content of Os07g0503900 protein in a recipient plant to obtain a plant variety with weakened resistance to the weed. The Os07g0503900 protein is any one of the proteins shown in (D1)-(D4) above.

In a twelfth aspect, the present invention claims a method for cultivating a plant variety with an increased content of tricin-5-O-glucopyranoside.

The present invention claims a method for cultivating a plant variety with an increased content of tricin-5-O-glucopyranoside, which can comprise the steps of: increasing the activity and/or content of Os07g0503900 protein in a recipient plant to obtain a plant variety with an increased content of tricin-5-O-glucopyranoside. The Os07g0503900 protein is any one of the proteins shown in (D1)-(D4) above.

In a thirteenth aspect, the present invention claims a method for cultivating a plant variety with a reduced content of tricin-5-O-glucopyranoside.

The method for cultivating a plant variety with a reduced content of tricin-5-O-glucopyranoside as claimed in the present invention can comprise the steps of: reducing the activity and/or content of Os07g0503900 protein in a recipient plant to obtain a plant variety with a reduced content of tricin-5-O-glucopyranoside. The Os07g0503900 protein is any one of the proteins shown in (D1)-(D4) above.

In a fourteenth aspect, the present invention claims a method for cultivating a transgenic plant with enhanced allelopathy.

The method for cultivating a transgenic plant with enhanced allelopathy as claimed in the present invention can comprise the steps of: introducing a nucleic acid molecule capable of expressing Os07g0503900 protein into a recipient plant to obtain a transgenic plant; the transgenic plant has enhanced allelopathy compared to the recipient plant; the Os07g0503900 protein is any one of the proteins shown in (D1)-(D4) above.

In a fifteenth aspect, the present invention claims a method for cultivating a transgenic plant with weakened allelopathy.

The method for cultivating a transgenic plant with weakened allelopathy as claimed in the present invention can comprise the steps of: inhibiting expression of a nucleic acid molecule capable of expressing Os07g0503900 protein in a recipient plant to obtain a transgenic plant; the transgenic plant has weakened allelopathy compared to the recipient plant; the Os07g0503900 protein is any one of the proteins shown in (D1)-(D4) above.

In a sixteenth aspect, the present invention claims a method for cultivating a transgenic plant with enhanced resistance to a weed.

The method for cultivating a transgenic plant with enhanced resistance to weeds as claimed in the present invention can comprise the steps of: introducing a nucleic acid molecule capable of expressing Os07g0503900 protein into a recipient plant to obtain a transgenic plant; the transgenic plant has enhanced weed resistance compared to the recipient plant; the Os07g0503900 protein is any one of the proteins shown in (D1)-(D4) above.

In a seventeenth aspect, the present invention claims a method for cultivating a transgenic plant with weakened resistance to a weed.

The method for cultivating a transgenic plant with weakened resistance to a weed as claimed in the present invention can comprise the steps of: inhibiting expression of a nucleic acid molecule capable of expressing Os07g0503900 protein in a recipient plant to obtain a transgenic plant; the transgenic plant has weakened weed resistance compared to the recipient plant; the Os07g0503900 protein is any one of the proteins shown in (D1)-(D4) above.

In an eighteenth aspect, the present invention claims a method for cultivating a transgenic plant with an increased content of tricin-5-O-glucopyranoside.

The method for cultivating a transgenic plant with an increased content of tricin-5-O-glucopyranoside as claimed in the present invention can comprise the steps of: introducing a nucleic acid molecule capable of expressing Os07g0503900 protein into a recipient plant to obtain a transgenic plant; the transgenic plant has an increased content of tricin-5-O-glucopyranoside compared to the recipient plant; the Os07g0503900 protein is any one of the proteins shown in (D1)-(D4) above.

In a nineteenth aspect, the present invention claims a method for cultivating a transgenic plant with a reduced content of tricin-5-O-glucopyranoside.

The method for cultivating a transgenic plant with a reduced content of tricin-5-O-glucopyranoside as claimed in the present invention can comprise the steps of: inhibiting expression of a nucleic acid molecule capable of expressing Os07g0503900 protein in a recipient plant to obtain a transgenic plant; the transgenic plant has a reduced content of tricin-5-O-glucopyranoside compared to the recipient plant; the Os07g0503900 protein is any one of the proteins shown in (D1)-(D4) above.

In a twentieth aspect, the present invention claims a method for inhibiting the growth of a weed.

The method for inhibiting the growth of a weed as claimed in the present invention can comprise the steps of: externally applying to the seeds of the weeds the leaf water washing solution of the plant variety cultivated by increasing the activity and/or content of the Os07g0503900 protein in the recipient plant.

Further, the leaf water washings can be prepared according to a method comprising the following steps: adding the leaves into water at a ratio of 12 g to 200 mL, sealing and shaking at 37° C. for 4 h extraction (220 rpm), and standing at room temperature for 20 h, freeze-drying to obtain a solid water washing; wherein each 12 mL of the solution of the leaf water washing (working solution) contains the solid water washing extracted from 12 g of leaves.

In each of the above aspects, the step of "increasing the activity and/or content of the Os07g0503900 protein in the recipient plant" can be implemented by introducing into the recipient plant a nucleic acid molecule capable of expressing the Os07g0503900 protein.

In each of the above aspects, the step of "reducing the activity and/or content of Os07g0503900 protein in the recipient plant" can be implemented by inhibiting the expression of nucleic acid molecules capable of expressing the Os07g0503900 protein in the recipient plant.

In each of the above aspects, the "nucleic acid molecule capable of expressing the Os07g0503900 protein" can specifically be any one of the following DNA molecules:

(E1) the DNA molecule shown in SEQ ID No.2 or SEQ ID No.4;

(E2) a DNA molecule that hybridizes to the DNA molecule defined in (E1) under stringent conditions and encodes the Os07g0503900 protein;

(E3) a DNA molecule that has more than 99%, more than 95%, more than 90%, more than 85% or more than 80% homology with the DNA sequence defined by (E1) or (E2) and encodes the Os07g0503900 protein.

In the above genes, the stringent conditions can be as follows: hybridizing in a mixed solution of 7% sodium dodecyl sulfate (SDS), 0.5M $Na_3PO_4$, and 1 mM EDTA at 50° C., rinsing in 2×SSC, 0.1% SDS at 50° C.; alternatively: hybridizing in a mixed solution of 7% SDS, 0.5M $Na_3PO_4$, and 1 mM EDTA at 50° C., and rinsing in 1×SSC, 0.1% SDS at 50° C.; alternatively: hybridizing in a mixed solution of 7% SDS, 0.5M $Na_3PO_4$, and 1 mM EDTA at 50° C., rinsing in 0.5×SSC, 0.1% SDS at 50° C.; alternatively: hybridizing in a mixed solution of 7% SDS, 0.5M $Na_3PO_4$ and 1 mM EDTA at 50° C., rinsing in 0.1×SSC, 0.1% SDS at 50° C.; alternatively: hybridizing in a mixed solution of 7% SDS, 0.5M $Na_3PO_4$ and 1 mM EDTA 50° C., rinsing in 0.1×SSC, 0.1% SDS at 65° C.; alternatively: hybridizing in a mixed solution of 6×SSC, 0.5% SDS solution at 65° C., and then washing the membrane once each with 2×SSC, 0.1% SDS and 1×SSC, 0.1% SDS.

In the foregoing, the step of "inhibiting the expression of nucleic acid molecules capable of expressing Os07g0503900 protein in a recipient plant" can be implemented by any technical means that can implement this purpose, such as cut the nucleic acid molecules by a sequence-specific nuclease (such as CRISPR/Cas9 nuclease), thereby reducing the expression of the nucleic acid molecule in the recipient plant.

In the present invention, the step of "inhibiting expression of a nucleic acid molecule capable of expressing Os07g0503900 protein in a recipient plant"is specifically implemented through CRISPER/Cas9 technology; the fragment in the Os07g0503900 genome fragment that conforms to the 5'-Nx-NGG-3' or 5'-CCN-Nx-3' sequence arrangement rule is the target sequence; N represents any one of A, G, C and T, 14≤X≤30, and X is an integer, Nx represents X consecutive deoxyribonucleotides. More specifically, in a specific embodiment of the present invention, X is 20. Correspondingly, the target sequence is specifically 5'-ATGCTGCGCAGCCGCTGCTG-3' or 5'-CAGCAGCGGCTGCGCAGCAT-3'.

In the foregoing, the step of "introducing a nucleic acid molecule capable of expressing Os07g0503900 protein into a recipient plant" can be implemented by any technical means that can implement this purpose.

In the present invention, the step of "introducing a nucleic acid molecule capable of expressing Os07g0503900 protein into a recipient plant" is specifically implemented by introducing a recombinant expression vector containing the nucleic acid molecule capable of expressing the Os07g0503900 protein into the recipient plant.

The recombinant expression vector can be constructed using existing plant expression vectors. The plant expression vector includes a binary Agrobacterium vector and a vector that can be used for plant microprojectile bombardment, etc., such as pCAMBIA-1300-221, pGreen0029, pCAMBIA3301, pCAMBIA1300, pBI121, pBin19, pCAMBIA2301, pCAMBIA1301-UbiN or other derived plant expression vectors. The plant expression vector can also contain the 3' untranslated region of the exogenous gene, i.e., containing the polyadenylation signal and any other DNA fragments involved in mRNA processing or gene expression. The polyadenylation signal can direct the addition of polyadenylation to the 3' end of the mRNA precursor. When using the gene to construct a recombinant expression vector, any enhanced, constitutive, tissue-specific or inducible promoter can be added before its transcription initiation nucleotide, such as cauliflower mosaic virus (CAMV) 35S promoter, Ubiquitin gene Ubiquitin promoter (pUbi), stress-inducible promoter rd29A, etc., which can be used alone or in combination with other plant promoters; in addition, when using the gene of the present invention to construct a recombinant expression vector, enhancers can also be used, including translation enhancers or transcription enhancers. These enhancer regions can be ATG initiation codons or adjacent region initiation codons, etc., but must be identical to the reading frame of the coding sequence to ensure correct translation of the entire sequence. The translation control signals and initiation codons can be derived from a wide variety of sources, either natural or synthetic. The translation initiation region can be derived from a transcription initiation region or a structural gene. In order to facilitate the identification and screening of transgenic plant cells or plants, the recombinant expression vector used can be processed, such as adding genes that can be expressed in plants encoding enzymes or light-emitting compounds that can produce color changes, antibiotic markers with resistance or anti-chemical reagent marker gene and so on. It is also possible to directly screen transformed plants under stress without adding any selectable marker genes.

In a twenty-first aspect, the present invention claims a plant variety or a transgenic plant cultivated by the above methods.

The plant variety or transgenic plant includes, but is not limited to, whole plants, seeds, reproductive tissues or organs, and the like.

Depending on the cultivation method, the plant variety can be any one of the following: a plant variety with enhanced allelopathy, a plant variety with weakened allelopathy, a plant variety with enhanced resistance to weeds, a plant variety with weakened resistance to weeds, a plant variety with an increased content of tricin-5-O-glucopyranoside, and a plant variety with a reduced content of tricin-5-O-glucopyranoside.

Depending on the cultivation method, the transgenic plant can be any one of the following: a transgenic plant with enhanced allelopathy, a transgenic plant with weakened allelopathy, a transgenic plant with enhanced resistance to weeds, a transgenic plant with weakened resistance to weeds, a transgenic plant with an increased content of tricin-5-O-glucopyranoside, and a transgenic plant with a reduced content of tricin-5-O-glucopyranoside.

In a twenty-second aspect, the present invention claims a compound that inhibits the growth of a weed.

The compound that inhibits the growth of weeds claimed in the present invention is specifically tricin-5-O-glucopyranoside.

In a twenty-third aspect, the present invention claims a leaf water washing or a solution thereof.

The leaf washing or the solution thereof claimed in the present invention is the "the leaf water washing of a plant variety obtained by increasing the activity and/or content of Os07g0503900 protein in a recipient plant" or the solution thereof.

The leaf water washing or the solution thereof contains tricin-5-O-glucopyranoside.

In the twenty-third aspect, the present invention claims the preparation method of the leaf water washing or the solution thereof described in the twenty-second aspect.

The preparation method of the leaf water washing or the solution thereof as claimed in the present invention can comprise the following steps: adding the leaves into water at a ratio of 12 g to 200 mL, sealing and shaking at 37° C. for 4 h extraction (220 rpm), and standing at room temperature for 20 h, freeze-drying to obtain a solid water washing; wherein each 12 mL of the solution of the leaf water washing (working solution) contains the solid water washings extracted from 12 g of leaves.

In a twenty-fourth aspect, the present invention claims use of the leaf water washing or the solution thereof in the twenty-second aspect in inhibiting the growth of a weed.

In a specific embodiment of the present invention, the inhibiting the growth of the weed is inhibiting the growth of a weed root.

In each of the above aspects, the plant can be rice; the weed can be barnyardgrass or lettuce.

In each of above aspects, the structural formula of tricin-5-O-glucopyranoside is shown in FIG. 1.

BRIEF DESCRIPTION OF THE FIGURE

FIGS. 5(A) and 5(B) show the nucleotide FIG. 5(A) and amino acid FIG. 5(B) sequences of the Os07g0503900mutant.

FIG. 6 shows the identification of Os07g0503900 overexpression materials.

FIG. 7 shows the content of tricin-5-O-glucopyranoside in mutants and overexpression materials. WT is wild-type ZH11 material, 4-1, 4-2, 4-3, and 4-4 are Os07g0503900 mutant materials, and O-1, O-2, O-3, and O-4 are Os07g0503900 overexpression materials.

BEST WAY TO IMPLEMENT THE INVENTION

Figure 1:
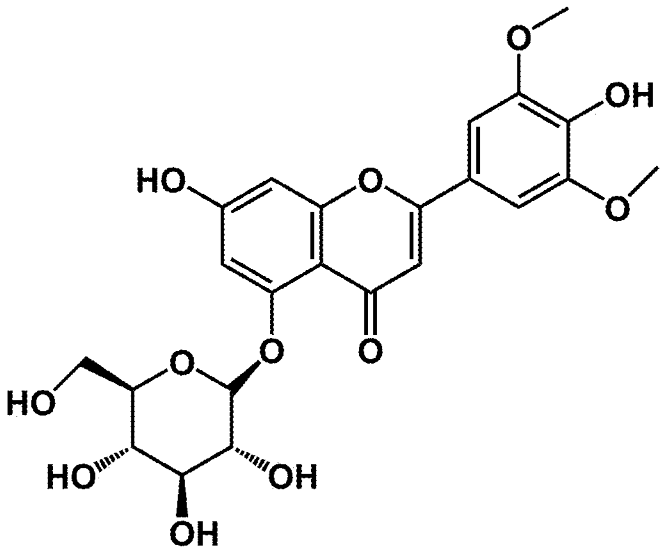
FIG. 1 shows the structural formula of tricin-5-O-glucopyranoside.

The following examples facilitate a better understanding of the present invention, but do not limit the present invention. The experimental methods in the following examples are conventional methods unless otherwise specified. The test materials used in the following examples are purchased from conventional biochemical reagent stores unless otherwise specified. The quantitative tests in the following examples are all set up to repeat the experiments three times, and the results are averaged.

Example 1

Compound Purification (1) Fresh leaves of rice (Indica) about 60 days after sowing were collected, dried with a freeze dryer and ground into powder. 8 times the volume of 75% ethanol was added, and ultrasonic extraction was performed three times for 20 min each time.

(2) The extract was filtered and concentrated with a rotary evaporator until there was no alcohol smell, followed by adding equal volumes of petroleum ether, dichloromethane and n-butanol to extract 3 times respectively.

(3) The obtained n-butanol phase was concentrated with a rotary evaporator, and then the medium and low pressure rapid preparative liquid chromatograph (BiotageIsolera™ Prime) was used for rough fractionation by wet loading. The silica gel column packing was YMC*GEL C18 spherical packing with a particle size of 50 μm and a pore size of 12 nm. The weight of the filler used in this example was 100 g. The mobile phase was water (containing 0.1% formic acid, % represented a volume percentage) and methanol. The mobile phase ratio was methanol 10%-90% 10 column volumes, methanol 90%-100% 2 column volumes. Flow rate: 50 mL/min, detection wavelengths at 210 nm and 254 nm. Through the initial score, a total of 10 components were obtained, numbered 1-10.

(4) UPLC-MS (Agilent 1290UPLC-6540Q-TOF) was used to detect the content of tricin-5-O-glucopyranoside in each component. 1 mL of each of the components obtained in (3) was placed in a 1.5 mL Eppendorf centrifuge tube, concentrated with a centrifugal concentrator, and then 200 μL of methanol was added and dissolved by vortexing. Centrifuged at 12,000 rpm for 10 min at 4° C. 100 μL of the supernatant was then pipetted into an Agilent injection bottle containing a 200 μL liner. It was then detected by UPLC-MS. Mobile phase A phase: 0.1% formic acid aqueous solution (% represented volume percentage); B phase: acetonitrile. Elution gradient: 0-2 min: 5% B-10% B, 2-12 min: 10% B-25% B, 12-18 min: 25% B-70% B, 18-23 min: 70% B-90% B, 23-25 min: 90% B-100% B, 25-30 min: 100% B, post-run for 5 min, wherein % all represented volume percentage. The flow rate was 0.3 mL/min, the column temperature: 40° C., and the injection volume: 5 μL. Electrospray ionization (ESI) was used for detection in positive ion mode. The carrier gas was high-purity nitrogen at a pressure of 40 psi and a temperature of 325° C. Through detection, it was found that components 2-7 contained tricin-5-O-glucopyranoside.

(5) The fractions containing the target compound tricin-5-O-glucopyranoside were combined and concentrated by a rotary evaporator. Tricin-5-O-glucopyranoside was then prepared using HPLC semi-preparative liquid chromatography (Agilent 1260). The specific preparation process was as follows: 0.2 mL of the concentrated component obtained in (4) was pipetted into an Agilent injection bottle, and 0.8 mL of 70% methanol solution (% all represented volume percentage) was added to dilute. After thorough mixing, samples were prepared by HPLC semi-preparative chromatography. Chromatographic column: Agilent Eclipse XDB-C18, size 9.4 (inner diameter)×250 mm (length), packing pore size 5 μm; column temperature: 40° C.; flow rate: 1.5 mL/min; detection wavelengths: 210 nm, 254 nm, 330 nm; Mobile phase: A ($H_2O$+0.1% formic acid, % represented volume percentage), B (methanol); mobile phase gradient elution program: A: 35%, B: 65%, ran for 60 min. The fraction with a retention time RT=56.8 min was collected and stored at −20° C. After all samples were prepared, all the collected components were gradually combined with a centrifugal concentrator, and then the samples were completely dried to obtain a single product of tricin-5-O-glucopyranoside.

(6) The obtained tricin-5-O-glucopyranoside compound single product was dissolved in 1 mL of CD3OD solution, and then the structure was identified by nuclear magnetic resonance (NMR) (BRUKER 800 MHz NMR). The NMR results of tricin-5-O-glucopyranoside were shown in Table 1 and FIG. 1.

TABLE 1

NMR results of compound tricin-5-O-glucopyranoside

| Carbon number | □□$\delta_H$□ | $\delta_C$ |
|---|---|---|
| 2 | / | 164.09 |
| 3 | 6.6 (s) | 107.18 |
| 4 | / | 180.31 |
| 5 | / | 160.11 |
| 6 | 6.8 (d, J = 2.2 Hz) | 104.89 |
| 7 | / | 165.21 |
| 8 | 6.7 (d, J = 2.2 Hz) | 99.41 |
| 9 | / | 160.69 |
| 10 | / | 109.29 |
| 1' | / | 122.51 |
| 2', 6' | 7.19 (s) | 105.03 |
| 3', 5' | / | 149.65 |
| 4' | / | 140.98 |
| OMe | 3.93 (s) | 57.03 |
| 1" | 4.83 (d, J = 7.7 Hz) | 105.07 |
| 2" | 3.59 (dd, J = 9.3 Hz, 7.7 Hz) | 74.75 |
| 3" | 3.50 (t, J = 9.3 Hz) | 77.31 |
| 4" | 3.45 (m) | 71.23 |
| 5" | 3.46 (m) | 78.62 |
| 6" | 3.94 (m) | 62.55 |
| 6" | 3.76 (dd, J = 12.1 Hz, 5.3 Hz) | |

Example 2

Os07g0503900 Gene Cloning (1) The genomic DNA of leaves at the seedling stage of japonica rice Zhonghua 11 (*Oryza sativa* L. ssp. *Japonica* cv. Zhonghua11, ZH11) was extracted.

(2) According to the existing sequence information of Os07g0503900 in Rice Annotation website (Rice Genome Annotation Project), primers F1/R1 containing BamHI and HindIII were used to amplify the CDS sequence of the Os07g0503900 gene containing the restriction site with ZH11 genomic DNA as the template.

```
Primer F1:
5'-ggatccATGGCTCCAGCGATGGCGAG-3';

Primer R1:
5'-aagcttCTATATGGATGACATGTGGGC-3'.
```

(2) The obtained gene fragment was ligated into pEASY-$T_3$ vector (TransGen Biotech, pEASY®-T3 Cloning Kit), transformed into *E. coli* DH5α competent cells, and positive clones were screened by blue and white spots.

(3) The positive clones were identified by PCR using primers F2/R2, and the amplified fragment size was 310 bp as positive clones. The primers were as follows:

```
Primer F2:
5'-AGGACTTCATCTCCCGGTTCATGC-3';

Primer R2:
5'-TTCTTCATCACAGGCGTCGGCAACA-3'.
```

(4) The positive clones were sequenced by a commissioned company, and the plasmids of the positive clones whose obtained sequences were consistent with the sequence information of the Rice Annotation website were extracted, and the recombinant plasmid was named pEASY-$T_3$-Os07g0503900.

The structure of the recombinant vector pEASY-$T_3$-Os07g0503900 was described as a recombinant plasmid after replacing the small fragment between the restriction sites BamHI and HindIII of the pEASY-$T_3$ vector with the DNA fragment shown in SEQ ID No. 2. SEQ ID No. 2 was the CDS sequence of the Os07g0503900 gene, which encoded the protein shown in SEQ ID No. 1.

Example 3

Use of Os07g0503900 Gene

1. Construction of Prokaryotic Expression Vector (1) The recombinant vector pEASY-T3-Os07g0503900 obtained in Example 2 was completely digested with restriction enzymes BamHI and HindIII, and the expression vector pMAL-c2X (Hua Yue Yang, VECT-570) was digested simultaneously. The digestion system was: 5 μg plasmid, 2.5 μL 10×digestion buffer, 2 μL BamHI, 2 μL HindIII, and dd$H_2O$ was added to supplement the reaction system to 50 μL. The reaction conditions of enzyme digestion were: digested at 37° C. for 4 hours.

(2) The digested products were separated by agarose electrophoresis, and the fragment of about 1.5 Kb containing Os07g0503900 and the pMAL-c2X vector fragment of about 6.6 Kb were recovered and dissolved in 30 μL of dd$H_2O$ respectively.

(3) The gene fragments obtained in step (2) were respectively ligated with the vector backbone fragments. The ligation reaction system was: 1 μL 10×ligase buffer, 0.5 μL $T_4$ DNA ligase, 1 μL pMAL-c2X vector fragment, 3 μL gene fragment, and dd$H_2O$ was added to supplement the reaction system to 10 μL. The ligation reaction conditions were: ligation at 4° C. for 12 hours.

(4) The product of the ligation reaction was transformed into *E. coli* DH5α competent cells, and the LB plate containing Ampicillin (Ampicillin concentration was 100 μg/mL) was used for screening.

(5) The positive clones were identified by PCR (primer F2/R2). The amplified fragment of Os07g0503900 positive clone was 310 bp.

```
Primer F2:
5'-AGGACTTCATCTCCCGGTTCATGC-3';

Primer R2:
5'-TTCTTCATCACAGGCGTCGGCAACA-3'.
```

(6) The obtained positive clones were sequenced by a commissioned company, and plasmids were extracted. The plasmid was a vector obtained by replacing the sequences between the two restriction sites of the pMAL-c2X vector BamHI and HindIII with the Os07g0503900 gene (SEQ ID No. 2), respectively named pMAL-Os07g0503900, which was a recombinant prokaryotic expression vector.

2. Prokaryotic Expression of Os07g0503900

(1) The obtained recombinant prokaryotic expression vector pMAL-Os07g0503900 was transformed into *E. coli* NovaBlue (Hua Yue Yang, WR4478) competent cells. At the same time, it was transferred into pMAL-c2X empty vector as a control. The positive clones were screened with LB plate containing Ampicillin, and then positive clones were identified by PCR. The primers were F2/R2, and the amplified fragment size was 310 bp.

(2) The positive clones were inoculated into 20 mL of LB liquid medium (containing 100 μg/mL Ampicillin), and incubated at 37° C. with shaking at 220 rpm for 12-14 h.

(3) The bacteria in (2) were transferred to 400 mL LB liquid medium (containing 100 μg/mL Ampicillin) at a ratio of 1:1000 (volume ratio), and cultivated to $OD_{600}$=0.6-0.8 at 37° C., 220 rpm.

(4) The bacteria were taken out and placed on ice, and then 160 μL of IPTG with a concentration of 500 mM was added to make the final concentration of IPTG 0.2 mM.

(5) Incubated at 16° C. with shaking at 100 rpm for 24 h to induce protein expression.

(6) The bacteria were collected by centrifugation at 10,000 rpm for 10 min at 4° C. The cells were then resuspended in column buffer and frozen at −20° C. overnight. Column buffer (1 L) was formulated as follows: NaCl 11.7 g; DTT 154 mg; 0.5 M EDTA 2 mL; 1 M Tris-HCl (pH=7.4) 40 mL; the balance was water.

(7) After the samples were thawed the next day, the cells were disrupted with a sonicator, and then centrifuged at 10,000 rpm for 10 min.

Figure 2:
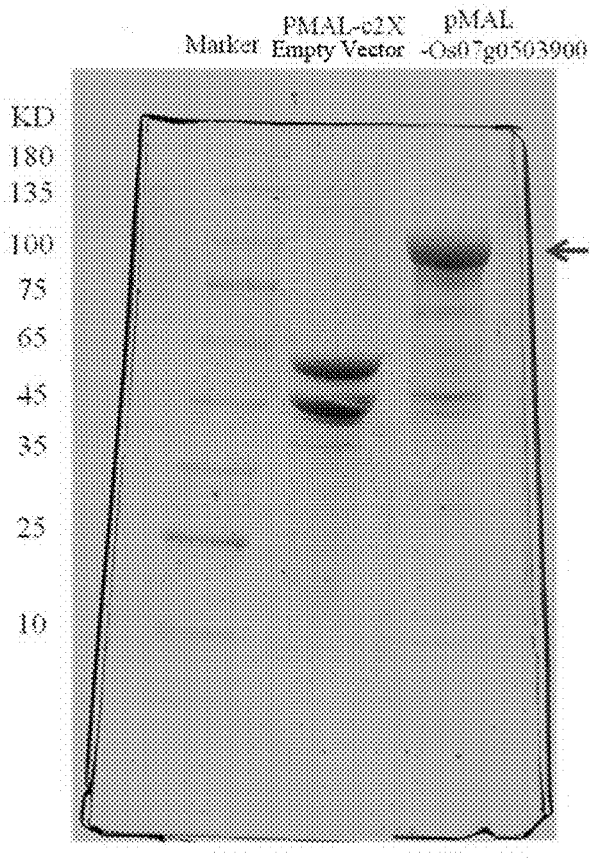
FIG. 2 shows the purification of Os07g0503900 protein. The red arrow is the size of the recombinant protein after protein purification.

(8) The target protein was purified with amylose column. The specific purification process was as follows:

a. A column buffer (the recipe of which was as above) was utilized to activate the affinity column packing (flow rate 1 mL/min).

b. The crude protein supernatant obtained in (7) was slowly added to the activated amylose column, and the flow rate was adjusted to about 0.5 mL/min, so that the target protein was fully combined with the affinity column packing.

c. After the sample flowed through the packing, column buffer was added and washed several times to remove unbound miscellaneous proteins.

d. 15 mL of column buffer containing maltose was added (3.6 g of maltose in 1 L of column buffer) to elute the target protein, and this step was repeated once.

e. The eluate was added into ultrafiltration tubes in batches, and centrifuged at 5000 rpm for 15 min at 4° C. each time.

f. 1 mL of 100 mM Tris-HCl was added, centrifuged at 5000 rpm for 15 min at 4° C., and the waste liquid was discarded. The target protein solution was transferred to a 1.5 mL Eppendorf centrifuge tube.

g. 2 μL of the obtained target protein solution was pipetted, and 1 mL of Bradford (Quick Start™ Bradford 1×Dye Reagent, BioRAD, CAS 67-56-1) was added, the absorption peak of the protein to be tested at 595 nm ($OD_{595}$) was measured by a spectrophotometer, and the absorption value of the target protein was converted into the protein concentration, and the concentration of the purified Os07g0503900 recombinant protein was 3.77 μg/μL.

h. After SDS-PAGE electrophoresis, the recombinant protein Os07g0503900 was confirmed to be about 110 KD in size by Coomassie brilliant blue staining (FIG. 2).

3. In Vitro Enzyme Activity of Os07g0503900

(1) The enzymatic reaction system was: Tris-HCl (pH 7.0, 50 mM, containing 10 mM DTT) 38 μL, 10 mM glycosyl acceptor (the glycosyl acceptor of Os07g0503900 was tricin) 1 μL, 100 mM glycosyl donor (UDPG) 1 μL, and 10 μL of the Os07g0503900 recombinant protein obtained in step 2 (Os07g0503900 protein concentration was 3.77 μg/μL). The reaction was carried out in a water bath at 30° C. for 1 h, and then quenched with an equal volume of methanol. A sample of the protein obtained from the *E. coli* transformed into the pMAL-c2X empty vector according to the above-mentioned step 2 was added as a control.

(2) Enzyme activity product detection: The sample in (1) was centrifuged at 4° C., 12,000 rpm for 10 min, and 30 μL was taken for detection by UPLC-MS (Agilent 1290UPLC-6540Q-TOF). Mobile phase A phase: 0.1% formic acid aqueous solution, % represented volume percentage; B phase: acetonitrile. Elution gradient: 0-2 min: 5% B-10% B, 2-12 min: 10% B-25% B, 12-18 min: 25% B-70% B, 18-23 min: 70% B-90% B, 23-25 min: 90% B-100% B, 25-30 min: 100% B, post-run for 5 min, % all represented volume percentage. The flow rate was 0.3 mL/min, the column temperature: 40° C., and the injection volume: 5 μL. Electrospray ionization (ESI) was used for detection in positive ion mode. The carrier gas was high-purity nitrogen at a pressure of 40 psi and a temperature of 325° C.

Figure 3:
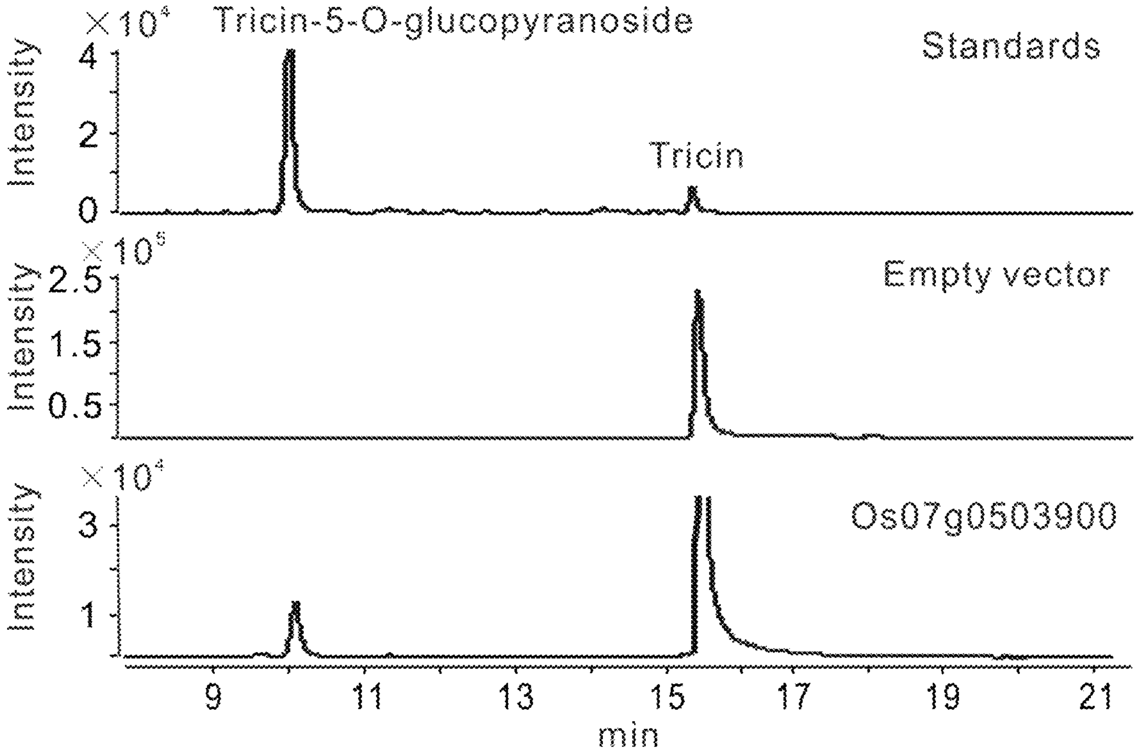
FIG. 3 shows a chromatogram of Os07g0503900 in vitro enzyme activity product detection. Standards are the standard products; Empty vector is the empty vector control group.
Figure 4:
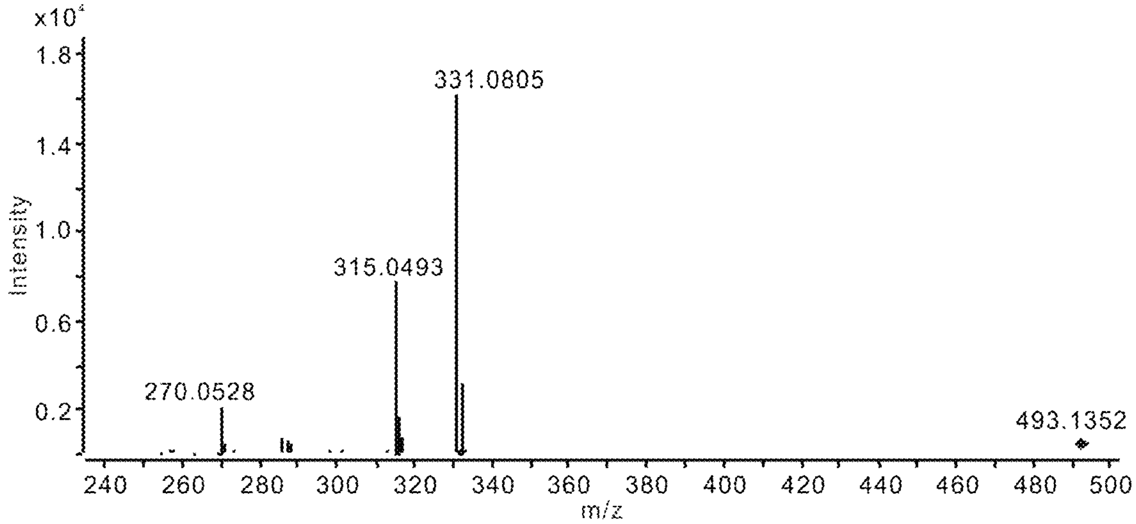
FIG. 4 shows a secondary mass spectrogram of tricin-5-O-glucopyranoside.

The test results showed that compared with the empty vector control group, a new chromatographic peak appeared in the reaction system with Os07g0503900 recombinant protein added, indicating that Os07g0503900 can catalyze the glycosylation of tricin in vitro, and the product of glycosylation was tricin-5-O-glucopyranoside (as shown in FIG. 3, FIG. 4).

Example 4

The Role of Os07g0503900 in Rice

1. Using CRISPR/Cas Technology to Create Os07g0503900 Rice Mutant

A CRISPR/Cas vector construction kit (BIOGLE, Cat #BGK03) was used to link guide RNA (gRNA) target sequences into CRISPR/Cas plasmids in one step and used for plant transformation. The specific process was as follows:

(1) The CRISPR-P website (http://crispr.hzau.edu.cn/CRISPR2/) was used to design the gRNA target sequence (Oligo), and the sequence characteristic sequence behind the target sequence was a NGG sequence (i.e.,a PAM sequence), the target sequence length was 20 bp.

Os07g0503900 target sequence 1:

```
5'-ATGCTGCGCAGCCGCTGCTG-3'.
```

The Oligo1 sequences corresponding to Os07g0503900 target sequence 1 were as follows:

```
Oligo1-F: 5'-TGTGTGATGCTGCGCAGCCGCTGCTGCGG-3';
Oligo1-R: 5'-AAACCCGCAGCAGCGGCTGCGCAGCATCA-3'.
```

Os07g0503900 target sequence 2:

```
5'-CGGTGAGCGACATGGCGGGG-3'.
```

The Oligo1 sequences corresponding to Os07g0503900 target sequence 2 were as follows:

```
Oligo2-F: 5'-TGTGTGCGGTGAGCGACATGGCGGGGCGG-3';
Oligo2-R: 5'-AAACCCGCCCCGCCATGTCGCTCACCGCA-3'.
```

Wherein, the underlined part was the vector-specific recognition sequence after the vector was digested, and the base in the box was the PAM sequence.

(2) Oligo dimers were prepared. The primers were dissolved at 10 μM, and Oligo dimers were prepared according to the following system: Buffer Aneal 18 μL, Oligo-F 1 μL, Oligo-R 1 μL. After mixing, it was heated at 95° C. for 3 min in a PCR machine, and then cooled to 20° C.

(3) Oligo dimers were ligated with CRISPR/Cas vectors. The ligation system was: 2 μL of CRISPR/Cas vector, 1 μL of Oligo dimers, 1 μL of Enzyme mix, and $ddH_2O$ was added to supplement the reaction system to 10 μL. After mixing, reaction was carried out at room temperature for 1 h.

(4) The ligation product was transformed into *E. coli* DH5α competent cells, and the LB plate containing Kanamycin (Kanamycin concentration was 50 μg/mL) was used for screening.

(5) The positive clones were identified by PCR and sequenced. The sequencing primer was: 5'-CCCAGTCACGAGTTGTAAA-3'.

(6) The positive cloned plasmids were transformed into Agrobacterium EHA105 competent cells, and YEB plates (100 mg/L Rif, 100 mg/L Kan) containing Rifampin and Kanamycin resistance were used for screening. A single colony was picked and identified by PCR with primers F3/R3, and the amplified fragment size was 481 bp.

```
Primer F3:
5'-CGAGAGCCTGACCTATTGCAT-3';

Primer R3:
5'-CTGCTCCATACAAGCCAACCAC-3'.
```

(7) The positive clones were inoculated into 50 mL of YEB liquid medium (containing 100 mg/L Rif, 100 mg/L Kan) at a ratio of 1:100 (volume ratio), and cultivated at 28° C. with shaking at 220 rpm to $OD_{600}$=0.5.

(8) The bacteria were collected by centrifugation at 4,000 rpm for 10 min, and the bacteria were resuspended with an equal volume of AAM-AS medium. Then callus of rice ZH11 was infected, and after transgenic seedlings grew, positive plants were screened with hygromycin (Hyg) resistance gene primers. The primers were F3/R3 (the sequence of which was as above), and the amplified fragment size was 481 bp.

Four positive mutant materials were randomly selected as 4-1, 4-2, 4-3 and 4-4. Among them, 4-1 and 4-2 were positive mutants of Oligo1 introduced into Os07g0503900. Compared with the wild-type sequence, these two mutants had G/T inserted at the 114 bp position, resulting in premature termination of protein translation. 4-3 and 4-4 were positive mutants of Oligo2 introduced into Os07g0503900. Compared with the wild-type sequence, these two mutants had a base T/A inserted at the 141 bp position, resulting in premature termination of protein translation (FIGS. 5(A) and 5(B)).

2. Creation of Os07g0503900 Gene Overexpression Rice

SEQ ID No. 4 was used as a template, and primers F4/R4 were used to amplify the sequence containing the restriction sites containing BamHI and KpnI, and the size of the amplified fragment was about 2.3 Kb.

```
Primer F4:
5'-ggatccGTTCATGTCTGAGGGGTGATTTC-3';

Primer R4:
5'-ggtaccCTATATGGATGACATGTGGGCCATTTC-3'.
```

(2) The obtained gene fragment was ligated into pEASY-T3 vector (TransGen Biotech, pEASY®-T3 Cloning Kit), transformed into *E. coli* DH5α competent cells, and positive clones were screened by blue and white spots.

(3) The positive clones were identified by PCR using primers F5/R5, and the amplified fragment size was 310 bp as positive clones.

```
Primer F5:
5'-AGGACTTCATGTCCCGGTTCATGC;

Primer R5:
5'-TTCTTCATCACAGGCGTCGGCAACA-3'.
```

(4) The positive clones were sequenced by a commissioned company, and the plasmids were extracted from the positive clones whose sequences were consistent with the sequence information of SEQ ID No. 4, and the recombinant plasmid was named SEQ4-T3.

The structure of the recombinant vector SEQ4-T3 was described as a recombinant plasmid after replacing the small fragment between the restriction sites BamHI and KpnI of the pEASY-T3vector with the DNA fragment shown in SEQ ID No.4. SEQ ID No. 4 encoded the protein shown in SEQ ID No. 3.

(5) The recombinant vector SEQ4-T3 obtained in (4) was completely digested with restriction enzymes BamHI and KpnI, and the expression vector pCAMBIA1301 (Hua Yue Yang, VECT0080) was digested simultaneously. The digestion system was: 5 μg plasmid, 2.5 μL 10×digestion buffer, 2 μL BamHI, 2 μL KpnI, and $ddH_2O$ was added to supplement the reaction system to 50 μL. The reaction conditions of enzyme digestion were: digestion at 37° C. for 4 hours.

(6) The digested products were separated by agarose electrophoresis, and the fragment of about 2.3 Kb containing SEQ ID No.4 and the pCAMBIA1301 vector fragment of about 12 Kb were recovered and dissolved in 30 μL of $ddH_2O$ respectively.

(7) The gene fragments obtained in step (6) were respectively ligated with the vector backbone fragments. The ligation reaction system was: 1 μL 10×ligase buffer, 0.5 μL $T_4$ DNA ligase, 1 μL pCAMBIA1301 vector fragment, 3 μL gene fragment, and $ddH_2O$ was added to supplement the reaction system to 10 μL. The ligation reaction conditions were: ligation at 4° C. for 12 hours.

(8) The product of the ligation reaction was transformed into *E. coli* DH5α competent cells, and the LB plate containing Kanamycin (Kanamycin concentration was 50 μg/mL) was used for screening.

(9) The positive clones were identified by PCR (primer F5/R5), and the amplified fragment size was 310 bp as a positive clone.

(10) The obtained positive clones were sequenced by a commissioned company, and plasmids were extracted. The plasmid was a vector obtained by replacing the sequences between the two restriction sites of the pCAMBIA1301 vector BamHI and KpnI with the SEQ ID No.4, named pCAM-SEQ4, which was a recombinant prokaryotic expression vector.

(11) The positive clones were inoculated into 50 mL of a YEB liquid medium (containing 100 mg/L Rif, 100 mg/L Kan) at a ratio of 1:100 (volume ratio), and cultivated at 28° C. with shaking at, 220 rpm to $OD_{600}$=0.5.

(12) The bacteria were collected by centrifugation at 4,000 rpm for 10 min, and the bacteria were resuspended with an equal volume of an AAM-AS medium. Then callus of rice ZH11 was infected, and after transgenic seedlings grew, positive plants were screened by GUS staining. Specifically, the rice leaves were transferred to a 2 mL Eppendorf tube containing GUS staining solution with tweezers, vacuumed to make the material sink completely, and stained overnight at 37° C. The material was then transferred to 70% ethanol for decolorization until the negative control material was white. Finally, the staining of each material was observed under a microscope and photographed and recorded; as shown in FIG. 6, the positive overexpression materials were O-1, O-2, O-3 and O-4.

The preparation method of GUS staining solution (100 mL) was as follows: Triton X-100 100 μL; 0.5 M EDTA 2 mL; 0.5 M potassium ferrocyanide [$K_3$Fe(CN)] 400 μL; 0.5 M potassium ferricyanide [$K_4$Fe] (CN)] 400 μL; X-Gluc (1 mg/mL) 1 mL, and the volume was then made up to 100 mL with a 0.1 M phosphate buffer PBS (pH 7.0).

3. Detection of Compounds in Genetic Materials Related to Os07g0503900

(1) Materials: transgenic rice and overexpression materials (4-1, 4-2, 4-3 and 4-4, O-1, O-2, O-3, O-4) and wild-type rice at the four-leaf stage were taken separately, and each genetic material contained four biological replicates. After sampling, they were frozen in liquid nitrogen immediately. And then dried in a cryogenic vacuum freezer. After the sample was completely dried, 20 mg was accurately weighed into a 2.0 mL Eppendorf tube. A stainless steel ball was added, and a MM400 ball mill (Roach, Germany) was used for grinding at a vibration frequency of 20 Hz for 10 min.

(2) Metabolite extraction. After the samples were crushed by a ball mill, 1 mL of the extract (methanol) pre-stored at −20° C. and 5 μL of umbelliferone lactone (2 mg/mL) (internal standard) were added, and the samples were extracted with shaking at 220 rpm at 37° C. for 2 h. The extract was then centrifuged at high speed of 12,000 rpm for 10 min. 500 μL of the supernatant was pipetted into an Agilent injection bottle, and then detected by UPLC-MS (Agilent 1290UPLC-6540Q-TOF). Mobile phase A phase: 0.1% formic acid aqueous solution, % represented volume percentage; B phase: acetonitrile. Elution gradient: 0-2 min: 5% B-10% B, 2-12 min: 10% B-25% B, 12-18 min: 25% B-70% B, 18-23 min: 70% B-90% B, 23-25 min: 90% B-100% B, 25-30 min: 100% B, post-run for 5 min, % all represented volume percentage. The flow rate was 0.3 mL/min, the column temperature: 40° C., and the injection volume: 5 μL. Electrospray ionization (ESI) was used for detection in positive ion mode. The carrier gas was high-purity nitrogen at a pressure of 40 psi and a temperature of 325° C.

(3) Analysis of Compounds in Genetic Materials Related to Os07g0503900

Compared with the wild type, the content of tricin-5-O-glucopyranoside in the Os07g0503900 mutant materials were significantly reduced, while the content of tricin-5-O-glucopyranoside in the gene overexpression materials were significantly increased (FIG. 7), indicating that Os07g0503900 can catalyze tricin to generate tricin-5-O-glucopyranoside, which were consistent with the in vitro biochemical results. In the mutants, there was a base insertion in the Os07g0503900 gene sequence, resulting in premature termination of protein translation (FIGS. 5A and 5(B)), and the loss of Os07g0503900 enzyme function, which ultimately made Os07g0503900 unable to catalyze tricin to produce tricin-5-O-glucopyranoside, therefore, the content of tricin-5-O-glucopyranoside was very low in the mutants.

Example 5

External Application of Compound tricin-5-O-glucopyranoside to Lettuce and Barnyardgrass 1. Experimental Process of External Application of Compound Tricin-5-O-Glucopyranoside to Lettuce and Barnyardgrass The reasons for choosing lettuce and barnyardgrass in the external application experiment were: lettuce was a common indicator crop reported in the literature for external application of allelopathic experiments, while barnyardgrass was the main weed in paddy fields.

(1) The compound of tricin-5-O-glucopyranoside was dried to a powder with a centrifugal concentrator and weighed, and an appropriate amount of sterile water was added to give a final concentration of 10 mg/mL.

(2) 500 mL of 0.8% agar was prepared and sterilized in an autoclave.

(3) The sterilized agar was placed in an ultra-clean bench and cooled to room temperature (note: the medium was not allowed to solidify), and then 4.75 mL of medium was accurately pipetted into a sterilized 10 mL centrifuge tube. 250 μL of the 10 mg/mL compound solution was added to give a final compound concentration of 500 mg/L. The medium containing the compound was quickly poured into a 10 cm×10 cm square dish, and the square dish was shaken quickly to make the medium evenly spread in the square dish. A medium in which 250 μL of sterile water was added to 4.75 mL of the medium was used as a control.

(4) Barnyardgrass and lettuce seeds were washed several times with distilled water, respectively, and then dried on sterile filter paper.

(5) After the medium was solidified, lettuce and barnyardgrass seeds were placed with sterile tweezers, and 26 seeds were placed in each culture dish (divided into two rows, 13 seeds in each row). Each treatment contained 3 biological replicates.

(6) The square dish with barnyardgrass and lettuce was placed in a 28° C. incubator in the dark for 3 days.

(7) Phenotypic statistics: the root length of each treated material was counted after 3 days.

At the same time, a control was set up to replace tricin-5-O-glucopyranoside with tricin.

2. External Application to Lettuce and Barnyardgrass

Figure 8:
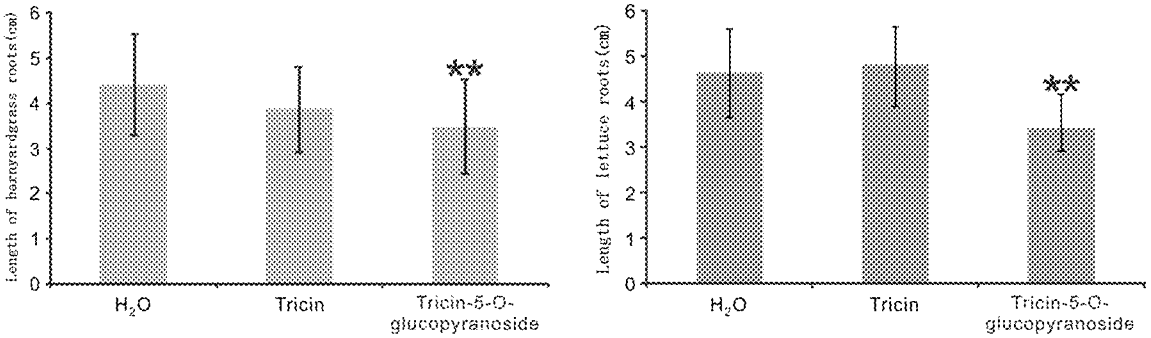
FIG. 8 shows that tricin-5-O-glucopyranoside can inhibit the growth of barnyardgrass or lettuce roots. In the figure, ** represents a very significant difference at the $P<0.01$ level.

Tricin is the main flavonoid with allelopathy in rice reported in the literature, but in this case, it was found that when the external application concentration was 500 mg/L, the inhibitory effect of tricin on the growth of barnyardgrass and lettuce was not obvious compared with the control. However, tricin-5-O-glucopyranoside had a very significant ability to inhibit the growth of lettuce and barnyardgrass compared with control and tricin (FIG. 8).

Example 6

External Application of Leaf Water Washings of Os07g0503900 Knockout Rice Mutants to Barnyardgrass 1. Collection of Mutant and Wild-Type Leaves The Os07g0503900 gene knockout rice mutant, overexpression and wild-type ZH11 materials were planted in the rice growth pool, and about 60 days after planting, the leaves of the mutants and wild-type materials were harvested.

2. Extraction of Leaf Water Washings of Mutants, and Wild-Type Materials (1) Mutants 4-1, 4-2, 4-3, overexpression materials O-1, O-2, O-3 (see Example 4) and 12 g of wild-type ZH11 leaves were taken respectively.

(2) The weighed leaves were placed in a 250 mL conical flask, 200 mL of distilled water was added, and the bottle mouth was sealed with a parafilm. The material was placed on a shaker at 37° C. and extracted for 4 hours at 220 rpm, then the material was taken out and was allowed to stand at room temperature for about 20 hours (Note: the total extraction time of leaf water washings was about 24 hours).

(3) The leaf water washings of each material were divided into four 50.0 mL sterile centrifuge tubes with lids, and then stored at −20° C.

(4) The water washings frozen at −20° C. was taken out and placed in a freeze dryer to be dried to obtain a solid water washings.

(5) After the washings were about to be freeze-dried, the washings in the four centrifuge tubes corresponding to each material were rinsed with an appropriate amount of distilled water, then the washings in each tube were combined, and the washings of each material were adjusted to a volume of 12.0 mL, so that every 12 mL of the leafwater washing solution contained the solid water washings extracted from 12 g of leaves. Then centrifuged at 12,000 rpm for 10 min and the supernatant was transferred to a new centrifuge tube. It was then placed in a −20° C. refrigerator for later use.

3. The Process of the External Application of the Leaf Water Washings to Barnyardgrass:

The water washings obtained above were externally applied to barnyardgrass, specifically as follows:

(1) 500 mL of 0.8% agar was prepared and sterilized in an autoclave.

(2) The sterilized agar was placed in an ultra-clean bench and cooled to room temperature, and then 5.00 mL of culture was accurately drawn into a sterilized 10 mL centrifuge tube. 1 mL of the prepared leaf water washing solution was added, fully inverted and mixed and quickly poured into a 10 cm×10 cm square dish, and the square dish was shaken quickly to make the medium evenly spread in the square dish. A medium with 1 mL of sterile water added to 5 mL of medium was used as a control.

(3) After the medium was solidified, barnyardgrass seeds were placed with sterile tweezers, and 26 seeds were placed in each culture dish (divided into two rows, 13 seeds in each row). Each treatment contained 3 biological replicates.

(4) The square dish with barnyardgrass was placed in a 28° C. incubator in the dark for 3 days.

(5) Phenotypic statistics: the root length of each treated material was counted after 3 days.

4. Phenotype of Barnyardgrass Applied Externally with Leaf Water Washings

Figure 9:
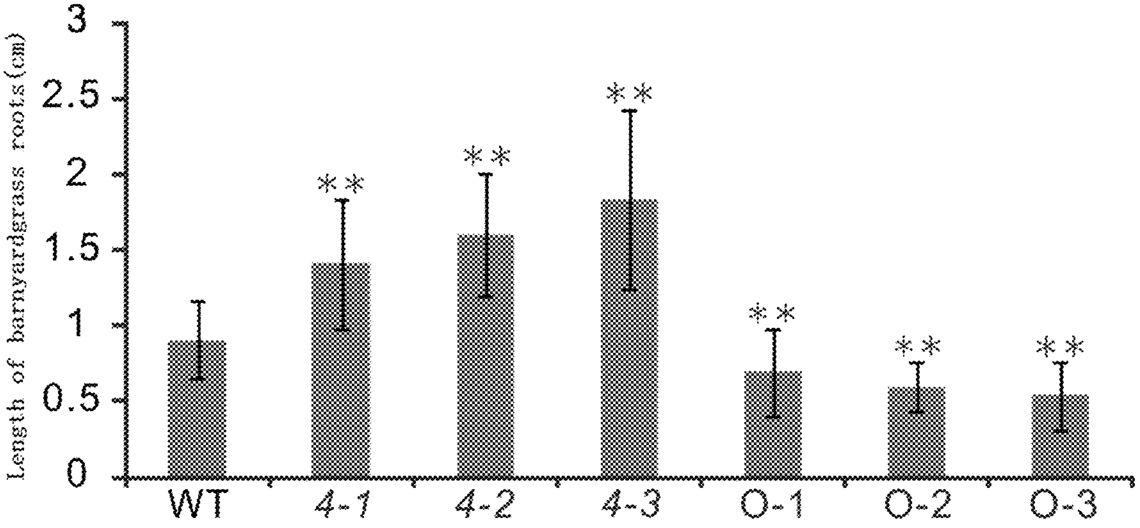
FIG. 9 shows the external application of mutant, overexpression and wild-type leaf water washings of barnyardgrass, and** in the figure represents a very significant difference at the $P<0.01$ level.

As shown in FIG. 9, the barnyardgrass roots increased significantly when barnyardgrass was applied with the leaf water washings of the mutant, while the barnyardgrass roots were significantly shortened when barnyardgrass was applied with the leaf water washings of the overexpression material, compared to the wild type. This is because the content of tricin-5-O-glucopyranoside in the mutant was reduced, while the content of tricin-5-O-glucopyranoside in the overexpression material was high (FIG. 7). Therefore, when the leaf water washings of the mutant was applied externally to barnyardgrass, the roots of barnyardgrass would become longer, however, when the leaf water washings of the overexpression material was applied externally to barnyardgrass, the roots of barnyardgrass were shortened. It indicated that tricin-5-O-glucopyranoside played an important role in inhibiting the growth of barnyardgrass, especially the growth of barnyardgrass roots.

INDUSTRIAL APPLICATION

The allelopathy-related flavonoid provided by the present invention was tricin-5-O-glucopyranoside. Compound external application experiments showed that tricin-5-O-glucopyranoside can significantly inhibit the growth of barnyardgrass and lettuce roots. In addition, in vitro enzyme activity experiments showed that Os07g0503900 can catalyze the formation of tricin-5-O-glucopyranoside from tricin. Altering the expression of this gene in rice resulted in significant changes in tricin-5-O-glucopyranoside content. It can be seen that tricin-5-O-glucopyranoside can regulate the allelopathy of plants and has great application value in inhibiting the growth of weeds. The present invention has great significance for developing an environment-friendly green pesticide, cultivating rice varieties with high allelopathy, and regulating the biosynthesis of tricin-5-O-glucopyranoside, and at the same time, it provides theoretical guidance for weed control in paddy fields.

The invention claimed is:

1. Any of the methods described below:

(I). A method for cultivating a plant variety with enhanced allelopathy, comprising the step of: increasing the content of tricin-5-O-glucopyranoside in a recipient plant to obtain a plant variety with enhanced allelopathy;

(II). A method for cultivating a plant variety with weakened allelopathy, comprising the step of: reducing the content of tricin-5-O-glucopyranoside in a recipient plant to obtain a plant variety with weakened allelopathy;

(III). A method for cultivating a plant variety with enhanced resistance to weeds, comprising the step of: increasing the content of tricin-5-O-glucopyranoside in a recipient plant to obtain a plant variety with enhanced resistance to weeds;

(IV). A method for cultivating a plant variety with weakened resistance to weeds, comprising the step of: reducing the content of tricin-5-O-glucopyranoside in a recipient plant to obtain a plant variety with weakened resistance to weeds; or (V). A method for inhibiting the growth of a weed, comprising the following step (C1):

(C1) externally applying a composition comprising tricin-5-O-glucopyranoside to rice fields so as to inhibit the growth of a weed in rice fields;

wherein, a working concentration of the tricin-5-O-glucopyranoside in the composition is 500 mg/L;

the composition is a leaf water washing solution for the plant variety in (I)-(IV) with enhanced resistance to weeds;

the leaf water washing solution is prepared according to a method comprising the steps of:

adding the leaves of the plant variety with enhanced resistance to weeds into water at a ratio of 12 g to 200 mL to form an aqueous suspension in a container;

sealing the container, then heating the aqueous suspension within the container to 37° C. to obtain a heated aqueous suspension;

shaking the heated aqueous suspension for 4 h to obtain an aqueous extraction solution;

resting the aqueous extraction solution at room temperature for 20 h to obtain a rested extraction solution;

freeze-drying the rested extraction solution to obtain a solid water washing wherein each 12 mL of the solid water washing comprises an extract quantity from 12 g of the leaves of the plant variety with enhanced resistance to weeds; and the recipient plant in (I)-(IV) is rice; the weed is barnyard grass or lettuce.

* * * * *

```
SEQUENCE LISTING

<160> NUMBER OF SEQ ID NOS: 4

<210> SEQ ID NO 1
<211> LENGTH: 490
<212> TYPE: PRT
<213> ORGANISM: Artificial sequence
<220> FEATURE:
<223> OTHER INFORMATION: Sythesized

<400> SEQUENCE: 1

Met Ala Pro Ala Met Ala Ser Ser Ala Ala Thr Val Val Leu Ile Pro
1               5                   10                  15

Phe Cys Val Ser Gly His Leu Thr Pro Met Leu Glu Val Gly Lys Arg
            20                  25                  30

Met Leu Arg Ser Arg Cys Cys Gly Asp Asp Asp Asp Gly Arg Pro Ala
        35                  40                  45

Met Ser Leu Thr Val Leu Leu Ala Gln Leu Pro Glu Ser His Arg Ala
```

-continued

```
    50                  55                  60

Pro Glu Ile Asp Glu Ile Ile Arg Arg Glu Ala Ala Gly Ala Ser Glu
65                  70                  75                  80

His Ser Gly Phe Asp Val Arg Phe His Cys Leu Pro Ala Glu Glu Leu
                85                  90                  95

Pro Asp Phe Arg Gly Gly Glu Asp Phe Ile Ser Arg Phe Met Gln Gln
            100                 105                 110

His Ala Ser His Ala Arg Glu Ala Ile Ala Gly Leu Glu Ser Arg Val
        115                 120                 125

Ala Ala Val Val Leu Asp Trp Phe Cys Thr Thr Leu Leu Asp Val Thr
    130                 135                 140

Arg Asp Leu Gly Leu Pro Gly Tyr Val Phe Phe Thr Ser Ala Ala Ser
145                 150                 155                 160

Met Leu Ser Leu Leu Leu Arg Leu Pro Ala Leu Asp Lys Glu Val Ala
                165                 170                 175

Val Asp Phe Glu Glu Met Gly Gly Ala Val Asp Leu Pro Gly Leu Pro
            180                 185                 190

Pro Val Pro Ala Ala Leu Leu Pro Thr Pro Val Met Lys Lys Gly Cys
        195                 200                 205

Asn Tyr Glu Trp Leu Val Tyr His Gly Ser Arg Phe Met Glu Ala Ala
    210                 215                 220

Gly Ile Ile Val Asn Thr Val Ala Glu Leu Glu Pro Ala Val Leu Glu
225                 230                 235                 240

Ala Ile Ala Asp Gly Arg Cys Val Pro Gly Arg Arg Val Pro Ala Ile
                245                 250                 255

Tyr Thr Val Gly Pro Val Leu Ser Phe Lys Thr Pro Pro Glu Lys Pro
            260                 265                 270

His Glu Cys Val Arg Trp Leu Asp Ala Gln Pro Arg Ala Ser Val Val
        275                 280                 285

Phe Leu Cys Phe Gly Ser Met Gly Ser Phe Ala Pro Pro Gln Val Leu
    290                 295                 300

Glu Ile Ala Ala Gly Leu Glu Arg Ser Gly His Arg Phe Leu Trp Val
305                 310                 315                 320

Leu Arg Gly Arg Pro Pro Ala Gly Ser Pro Tyr Pro Thr Asp Ala Asp
                325                 330                 335

Ala Asp Glu Leu Leu Pro Glu Gly Phe Leu Glu Arg Thr Lys Gly Arg
            340                 345                 350

Gly Met Val Trp Pro Thr Trp Ala Pro Gln Lys Asp Ile Leu Ala His
        355                 360                 365

Ala Ala Val Gly Gly Phe Val Thr His Gly Gly Trp Asn Ser Thr Leu
    370                 375                 380

Glu Ser Leu Trp His Gly Val Pro Met Ala Pro Trp Pro Leu Tyr Ala
385                 390                 395                 400

Glu Gln His Leu Asn Ala Phe Glu Leu Val Arg Asp Met Gly Val Ala
                405                 410                 415

Val Glu Met Glu Val Asp Arg Lys Arg Gly Asn Leu Val Glu Ala Ala
            420                 425                 430

Glu Leu Glu Arg Ala Val Arg Cys Leu Met Asp Glu Gly Ser Glu Glu
        435                 440                 445

Gly Arg Met Ala Arg Glu Lys Ala Ala Ala Ala Lys Ala Ala Cys Arg
    450                 455                 460

Asn Ala Val Asp Gly Gly Gly Ser Ser Ile Ala Ala Leu Arg Lys Leu
465                 470                 475                 480
```

Thr Gln Glu Met Ala His Met Ser Ser Ile
485 490

<210> SEQ ID NO 2
<211> LENGTH: 1473
<212> TYPE: DNA
<213> ORGANISM: Artificial sequence
<220> FEATURE:
<223> OTHER INFORMATION: Sythesized

<400> SEQUENCE: 2
atggctccag cgatggcgag ctcagcagcg acggtggtgc tgatcccgtt ctgcgtctcc 60
ggccacctca cgcccatgct ggaagtcggc aagcggatgc tgcgcagccg ctgctgcggc 120
gacgacgacg acggccgccc cgccatgtcg ctcaccgtgc tcctcgcgca gctgccggag 180
tcccaccgcg cgcccgagat cgacgagatc atccgccgtg aagcggccgg cgcgtcggag 240
cactccggct tcgacgtccg gttccactgc ctccccgccg aggagctccc ggacttccgc 300
ggcggcgagg acttcatctc ccggttcatg cagcagcacg cgtcgcacgc cagggaggcc 360
atcgccggcc tcgagtcccg cgtcgccgcc gtggtcttgg actggttctg caccacgctc 420
ctcgacgtca cccgcgacct cggcctcccc gggtacgtgt tcttcacgtc cgccgcctcc 480
atgctctcgc tcctgctgcg gttgccggcg ctggacaagg aggtggccgt ggatttcgag 540
gagatgggag gcgccgtcga cttaccgggg ttgccgcctg tgccggcggc tctgttgccg 600
acgcctgtga tgaagaaggg ttgcaactac gagtggctcg tgtaccacgg gagccgcttc 660
atggaggctg cggggatcat cgtcaacacg gtggccgagc tcgagccggc cgtcctcgag 720
gccatcgccg acggccggtg cgtgccggga cgccgcgtcc cggccatcta cacggtcggc 780
cccgtgctgt cgttcaagac gccgcccgag aagccgcacg agtgcgtgcg gtggctcgac 840
gcgcagccgc gagcgtcggt cgtgttcctc tgcttcggga gcatgggcag cttcgcgccg 900
ccgcaggtgc tcgagatagc cgccggcctc gagcgcagcg ggcaccgctt cctgtgggtg 960
ctgcgcggcc gtccacccgc cggctcgccg tacccgacgg acgccgacgc cgacgagctc 1020
ctcccggagg ggttcctgga gaggaccaag gggaggggca tggtgtggcc gacgtgggcg 1080
ccgcagaagg acatcctcgc ccacgccgcc gtgggaggct tcgtgacgca cggcgggtgg 1140
aactcgacgc tggagagcct gtggcacggc gtgccgatgg cgccgtggcc gctgtacgcg 1200
gagcagcacc tgaacgcgtt cgagctcgtg cgcgacatgg gcgtcgccgt ggagatggag 1260
gtggacagga agcggggcaa cttggtggag gcggcggagc tggagcgcgc ggtgcggtgc 1320
ctgatggacg agggatcgga ggaggggagg atggcgaggg agaaggcggc ggcggcgaag 1380
gcggcgtgcc ggaacgccgt ggacggaggc gggtcgtcga tagcggcgtt gcggaagctc 1440
acgcaagaaa tggcccacat gtcatccata tag 1473

<210> SEQ ID NO 3
<211> LENGTH: 489
<212> TYPE: PRT
<213> ORGANISM: Artificial sequence
<220> FEATURE:
<223> OTHER INFORMATION: Sythesized

<400> SEQUENCE: 3

Met Ala Ser Ala Met Ala Ser Ser Ala Ala Thr Val Val Leu Ile Pro
1 5 10 15

Phe Cys Val Ser Gly His Leu Thr Pro Met Leu Glu Val Gly Lys Arg
20 25 30

-continued

```
Met Leu Arg Ser Arg Cys Cys Gly Asp Asp Asp Asp Gly Arg Pro Ala
        35                  40                  45

Met Ser Leu Thr Val Leu Leu Ala Gln Leu Pro Glu Ser His Arg Ala
    50                  55                  60

Pro Glu Ile Asp Glu Ile Ile Arg Arg Glu Ala Ala Gly Ala Ser Glu
65                  70                  75                  80

His Ser Gly Phe Asp Val Arg Phe His Cys Leu Pro Ala Glu Glu Leu
                85                  90                  95

Pro Asp Phe Arg Gly Gly Glu Asp Phe Met Ser Arg Phe Met Gln Gln
            100                 105                 110

His Ala Ser His Ala Arg Glu Ala Ile Ala Gly Leu Glu Ser Arg Val
        115                 120                 125

Ala Ala Val Val Leu Asp Trp Phe Cys Thr Thr Leu Leu Asp Val Thr
    130                 135                 140

Arg Asp Leu Gly Leu Pro Gly Tyr Val Phe Phe Thr Ser Ala Ala Ser
145                 150                 155                 160

Met Leu Ser Leu Leu Leu Arg Leu Pro Ala Leu Asp Lys Glu Val Ala
                165                 170                 175

Val Asp Phe Glu Glu Met Gly Gly Ala Val Asp Leu Pro Gly Leu Pro
            180                 185                 190

Pro Val Pro Ala Ala Leu Leu Pro Thr Pro Val Met Lys Lys Gly Cys
        195                 200                 205

Asn Tyr Glu Trp Leu Val Tyr His Gly Ser Arg Phe Met Glu Ala Ala
    210                 215                 220

Gly Ile Ile Val Asn Thr Val Ala Glu Leu Glu Pro Ala Val Leu Glu
225                 230                 235                 240

Ala Ile Ala Asp Gly Arg Cys Val Pro Gly Arg Arg Val Pro Ala Ile
                245                 250                 255

Tyr Thr Val Gly Pro Val Leu Ser Phe Lys Thr Pro Pro Glu Lys Pro
            260                 265                 270

His Glu Cys Val Arg Trp Leu Asp Ala Gln Pro Arg Ala Ser Val Val
        275                 280                 285

Phe Leu Cys Phe Gly Ser Met Gly Ser Phe Ala Pro Pro Gln Val Leu
    290                 295                 300

Glu Ile Ala Ala Gly Leu Glu Arg Ser Gly His Arg Phe Leu Trp Val
305                 310                 315                 320

Leu Arg Gly Gln Pro Ala Ala Gly Met Pro Tyr Pro Thr Asp Ala Val
                325                 330                 335

Val Asp Glu Leu Leu Pro Glu Gly Phe Leu Glu Arg Thr Lys Glu Lys
            340                 345                 350

Gly Leu Val Trp Ser Lys Trp Ala Pro Gln Lys Glu Ile Leu Ala His
        355                 360                 365

Pro Ala Val Gly Gly Phe Ala Thr His Cys Gly Trp Asn Ser Thr Leu
    370                 375                 380

Glu Ser Leu Trp Asn Gly Val Pro Leu Leu Pro Trp Pro Leu Tyr Ala
385                 390                 395                 400

Glu Gln His Leu Asn Ala Phe Glu Leu Val Arg Asp Met Gly Val Ala
                405                 410                 415

Val Glu Met Glu Val Asp Arg Lys Arg Gly Asn Leu Val Glu Ala Ala
            420                 425                 430

Glu Leu Glu Arg Ala Val Arg Cys Leu Met Asp Glu Gly Ser Glu Gly
        435                 440                 445
```

-continued

```
Arg Met Ala Arg Glu Lys Ala Ala Ala Ala Lys Ala Ala Cys Arg Asn
    450                 455                 460

Ala Val Asp Gly Gly Gly Ser Ser Ile Ala Ala Leu Arg Lys Leu Thr
465                 470                 475                 480

Gln Glu Met Ala His Met Ser Ser Ile
                485
```

<210> SEQ ID NO 4
<211> LENGTH: 2237
<212> TYPE: DNA
<213> ORGANISM: Artificial sequence
<220> FEATURE:
<223> OTHER INFORMATION: Sythesized

<400> SEQUENCE: 4

```
gttcatgtct gaggggtgat ttctgtagat ttagaccatt aaatttaata gaatagcttt     60

ggcgtacatt atggttattt tttatcgacg agtaggccta cttgttctga ataaacatga    120

cgccatgtgc ggcgtatttc tttttttttt ttcaaagcaa cccgggaaat ctggacagtc    180

agcgggaaaa acaagggtag tcagcatcca ttgtgacgtg gtccattgac tgcattcatg    240

ttacccctcc cctctggcac ccgatgtgca cgccaaaatg acaagcctcc gcagggtctg    300

tttagtttcc aaataaaaat tttccacaat gtcacactag atgtttggtt atatatatat    360

atatatatat atatatatat atatatatat atatatatat gtgtgtgtgt gtgtaaaata    420

ttaaatatat aaaaaaacta attatatata ttacatgtaa attacgagat aaatctttta    480

agctcaatta ctccataatt tgataattta ttaatgacgg attaattaga cttaataaat    540

tcttctcgca gttcttagac gtaatatgta atttatttta ttattaattt atatttaata    600

tatatttaat actttaaata tgtatctata tccgatgtta catttcaaaa attttcgttt    660

gcgaactaaa aaggccctca gtcctcagct tcagtgcctc acgcttgcaa caatatcgtc    720

ctccctgtcc gtgtactgtg aatctgccat ctgtgacttc gtgagacatg gcttcagcga    780

tggcgagctc agcagcgacg gtcgtgctga tcccgttctg cgtctccggc cacctcacgc    840

ccatgctgga agtcggcaag cggatgctgc gcagccgctg ctgcggcgac gacgacgacg    900

gccgccccgc catgtcgctc accgtgctcc tcgcgcagct gccggagtcc caccgcgcgc    960

ccgagatcga cgagatcatc cgccgtgaag cggccggcgc gtcggagcac tccggcttcg   1020

acgtccggtt ccactgcctc cccgccgagg agctcccgga cttccgcggc ggcgaggact   1080

tcatgtcccg gttcatgcag cagcacgcgt cgcacgccag ggaggccatc gccggcctcg   1140

agtcccgcgt cgccgccgtg gtcttggact ggttctgcac cacgctcctc gacgtcaccc   1200

gcgacctcgg cctccccggg tacgtgttct tcacgtccgc cgcctccatg ctctcgctcc   1260

tgctgcggtt gccggcgctg gacaaggagg tggccgtgga tttcgaggag atgggaggcg   1320

ccgtcgactt accggggttg ccgccggtgc cggcggctct gttgccgacg cctgtgatga   1380

agaagggttg caactacgag tggctcgtgt accacgggag ccgcttcatg gaggctgcgg   1440

ggatcatcgt caacacggtg gccgagctcg agccggccgt cctcgaggcc atcgccgacg   1500

gccggtgcgt gccgggacgc cgcgtcccgg ccatctacac ggtcggcccc gtgctgtcgt   1560

tcaagacgcc gcccgagaag ccgcacgagt gcgtgcggtg gctcgacgcg cagccgcgag   1620

cgtcggtcgt gttcctctgc ttcgggagca tgggcagctt cgcgccgccg caggtgctcg   1680

agatagccgc cggcctcgag cgcagcggcc accgcttcct gtgggtactg cgcggccagc   1740

cagccgccgg catgccatac ccgacggacg ccgtcgtcga cgagctcctc cccgaggggt   1800
```

-continued

```
tcttggagag gaccaaggag aagggcctcg tgtggtccaa gtgggcgccg cagaaggaga   1860

tcctcgccca ccctgccgtc ggcggcttcg cgacgcactg cgggtggaac tcgacgctgg   1920

agagcctgtg gaacggcgtg ccgctactgc cgtggccgct gtacgcggag cagcacctga   1980

acgcgttcga gctcgtgcgc gacatgggcg tcgccgtgga gatggaggtg gacaggaagc   2040

ggggcaactt ggtggaggcg gcggagctgg agcgcgcggt gcggtgcctg atggacgagg   2100

gatcggaggg gaggatggcg agggagaagg cggcggcggc gaaggcggcg tgccggaacg   2160

ccgtggacgg aggcgggtcg tcgatagcgg cgttgcggaa gctcacgcaa gaaatggccc   2220

acatgtcatc catatag                                                  2237
```